(12) United States Patent
Ohazulike et al.

(10) Patent No.: US 11,593,687 B2
(45) Date of Patent: Feb. 28, 2023

(54) VEHICLE OPERATION ANALYSIS OF A DRIVER

(71) Applicant: Hitachi, Ltd., Tokyo (JP)

(72) Inventors: Anthony Emeka Ohazulike, Valbonne (FR); Peter Hohmann, London (GB)

(73) Assignee: HITACHI, LTD., Tokyo (JP)

( * ) Notice: Subject to any disclaimer, the term of this patent is extended or adjusted under 35 U.S.C. 154(b) by 1087 days.

(21) Appl. No.: 16/243,114

(22) Filed: Jan. 9, 2019

(65) Prior Publication Data

US 2019/0228328 A1 Jul. 25, 2019

(30) Foreign Application Priority Data

Jan. 23, 2018 (EP) .................................... 18152962

(51) Int. Cl.

| G06Q 40/08 | (2012.01) |
|---|---|
| G06N 5/04 | (2006.01) |
| G07C 5/08 | (2006.01) |
| G06N 5/048 | (2023.01) |
| G06Q 10/0639 | (2023.01) |

(52) U.S. Cl.
CPC ......... *G06N 5/048* (2013.01); *G06Q 10/0639* (2013.01); *G06Q 40/08* (2013.01); *G07C 5/085* (2013.01)

(58) Field of Classification Search
CPC ......... G06Q 40/08; G07C 5/085; G06N 5/048
See application file for complete search history.

(56) References Cited

U.S. PATENT DOCUMENTS

| 9,449,437 B2 | 9/2016 | Izumi et al. |
| 9,454,786 B1 | 9/2016 | Srey et al. |
| 9,672,570 B1 | 6/2017 | Slusar et al. |
| 10,600,258 B1 * | 3/2020 | Biemer ................. B60W 40/08 |

(Continued)

FOREIGN PATENT DOCUMENTS

| EP | 2 667 349 A1 | 11/2013 |
| JP | 2007-203913 A | 8/2007 |

(Continued)

OTHER PUBLICATIONS

Japanese Office Action received in corresponding Japanese Application No. 2019-005245 dated Nov. 12, 2019.

(Continued)

*Primary Examiner* — Scott S Trotter
*Assistant Examiner* — William D Newlon
(74) *Attorney, Agent, or Firm* — Mattingly & Malur, PC

(57) ABSTRACT

It is described at least a method for performing vehicle operation analysis of a driver, comprising retrieving data related to the operation of the vehicle via a mobile device, wherein the mobile device is placed inside the vehicle and the retrieved data is data that is at least provided by data providing units included in the mobile device; adding a driver-specific identifier to the retrieved data which identifies the driver of the vehicle irrespective of the vehicle that is used; performing analysis of the retrieved data in the mobile device, and/or sending the retrieved data to a remote computer and performing analysis of said data in the remote computer, wherein the analysis includes extracting driver-specific vehicle operation schemes and/or calculating a driver-specific safety factor.

10 Claims, 9 Drawing Sheets

(56) References Cited

U.S. PATENT DOCUMENTS

| | | | |
|---|---|---|---|
| 10,623,401 B1* | 4/2020 | Yager | H04L 67/12 |
| 10,915,965 B1* | 2/2021 | Fields | G06Q 30/0207 |
| 11,302,209 B2* | 4/2022 | Skagius | G09B 5/02 |
| 2010/0131304 A1* | 5/2010 | Collopy | G06Q 30/0224 |
| | | | 705/4 |
| 2013/0046510 A1* | 2/2013 | Bowne | G06Q 10/0639 |
| | | | 702/187 |
| 2013/0151288 A1 | 6/2013 | Bowne et al. | |
| 2014/0180730 A1 | 6/2014 | Cordova et al. | |
| 2015/0191178 A1* | 7/2015 | Roy | H04W 4/027 |
| | | | 701/36 |
| 2017/0142556 A1* | 5/2017 | Matus | H04W 4/40 |
| 2017/0148350 A1* | 5/2017 | Stankoulov | B60W 50/14 |
| 2018/0025555 A1* | 1/2018 | Davidson | G06Q 10/083 |
| | | | 701/41 |
| 2021/0272207 A1* | 9/2021 | Fields | G08G 1/096827 |

FOREIGN PATENT DOCUMENTS

| | | |
|---|---|---|
| JP | 2015-184968 A | 10/2015 |
| JP | 2017-97477 A | 6/2017 |

OTHER PUBLICATIONS

Communication Pursuant to Article 94(3) EPC received in corresponding European Application No. 18 152 962.9 dated May 13, 2020.

* cited by examiner

Fig. 4a Start of a straight road before a S curve

Fig. 4b Straight road between the two curves of a S curve

Fig. 4c Straight road after a S-curve

VEHICLE OPERATION ANALYSIS OF A DRIVER

CLAIM OF PRIORITY

The present application claims priority from European patent application 18152962.9 filed on Jan. 23, 2018, the content of which is hereby incorporated by reference into this application.

BACKGROUND

The subject-matter described relates to a method for performing vehicle operation analysis of a driver, a computer program product configured to carry out said method and a mobile device configured to carry out said method. Further, the subject-matter described relates to a computer program product being an application to be installed in a vehicle operating system to carry out said above method and to a vehicle with said computer program product being installed in the vehicle operating system.

Computerized analysis of vehicle operation of a driver (driving behavior analysis) can bring about technical advantages: For example, a driving license may be made valid for different countries or companies based on the data obtained from the computerized vehicle operation analysis of a driver who may be applying for a new driving license or the like. Having the information about the driving behavior of said driver at hand it can be enabled, for example, that the driver does not have to undergo additional tests to obtain driving licenses for different countries or companies. Further, the data obtained from the vehicle operation/driving behavior analysis may be used for calculating insurance premiums and the like. An automated and tailor-made calculation of premiums for a specific driver and the personal driving style would be enabled.

Computerized vehicle operation or driving behavior analysis is, for example, described by US 2013/0151288 A1 which, however, i.a. has the technical disadvantage that a mobile device is related to a specific vehicle so that the driver cannot be analyzed if he uses different vehicles, for example in a car-sharing scenario, when he owns several cars or when he is a professional driver using a different company-owned car every day or the like.

SUMMARY

In view of the above, it is an object to provide at least a method for performing vehicle operation analysis of a driver, a computer program product configured to cause for example a mobile device or a vehicle to carry out said method and a mobile device as well as a vehicle configured to carry out said method, wherein the method allows tracking the vehicle operation characteristics of a driver irrespective of the vehicle he is using. Further, it shall be enabled that the tracking of the driver's operational behavior is improved in view of accuracy and protection against fraud. This object is attained by the subject-matter that is described and claimed by the appended claims.

It is claimed, in particular, a method for performing vehicle operation analysis of a driver. The method may comprise the steps, the order of performing each step may vary and one or more of the steps may be repeated, of retrieving data related to the operation of the vehicle via a mobile device, adding a driver-specific identifier to the retrieved data which identifies the driver of the vehicle irrespective of the vehicle that is used. Further, the analysis of the retrieved data may be performed in the mobile device, and/or it may be send to a remote computer and analysis of said data may be performed in the remote computer.

In view of the above it is noted that the mobile device may be placed inside the vehicle such that it may be positional fixed, which shall mean that the mobile device may be placed inside the interior of the vehicle (by the driver) so that it may not slip, turn, move or the like during the driving operation of the vehicle. The positional fixation is preferably temporally, which means that the driver may take the mobile device with him/her after leaving the vehicle. Further, the mobile device may be placed inside the vehicle so that it may rotate so that the mobile device may rotate and the data received from the mobile device may be normalized irrespective of how it is placed in the car.

However, it is noted that in an alternative to the claimed subject-matter the mobile device may be replaced by a computing unit or the like fixedly installed in the vehicle. In said alternative the method would be performed by a software application ("app") which is downloaded to the OS of the vehicle and the driver would then login in at the app when he/she enters a vehicle. When the driver changes the vehicle the driver would have to download the app to the other vehicle, if the app is not preinstalled. The steps of method would stay the same, however, the data retrieved may then preferably retrieved from vehicle-own sensors or vehicle-external data providing units, while, as described below, the data retrieved in the case of using a mobile device are preferably sensors and the like which are provided in the mobile device and that are external to the vehicle. Further, a combination of both alternatives may also be used, which is also described in more detail below, i.e. a combination in which the mobile device is connected to the vehicle so that the data may be retrieved from all kind of sources, mobile device-internal, vehicle-internal and vehicle external.

Further, the retrieved data may be data that is provided by data providing units, preferably included in the mobile device. "At least" in this connection in claim 1 may especially mean that data may be provided from further sources, as described below, as well. The data providing units may especially comprise sensors, transducers, transmitters, receivers, or the like. For example, the retrieved data may be the sensor output of one or more G-force sensors provided in the mobile device, the sensor output of a pressure or temperature sensor provided in the mobile device, and/or the information about the position provided by a geolocation signal, such as a GPS signal, and the like.

The mobile device or a remote computer and/or a remote computer network may perform analysis of the retrieved data in order to generate analyzed/post-processed retrieved data, wherein the analysis may include extracting driver-specific vehicle operation schemes and/or calculating a driver-specific safety/risk factor.

The method may include that the mobile device performs the entire analysis by mobile device internal computing units and sends the post-processed/analyzed (retrieved) data wirelessly to a remote computer, remote computer network or the like in which the data may be stored in a driver-specific storage place which may be determined based on the driver-specific identifier added to the data. The method may in addition or alternatively include that the mobile device does not run any analysis which is only performed on the remote computer(s) after the data was send thereto. And, the method may alternatively include that the analysis is shared between the mobile device and the remote computer(s), for example in a way that light analytics for which sufficient computing power is provided within the mobile device is carried out by the mobile device, and the remote computer(s) may carry out heavy analytics. Light analytics may include post-processing operations of the retrieved data which do not require a lot of computing power, such as converting, formatting or the like.

The extracting of driver-specific vehicle operation schemes and/or calculating a driver-specific safety or risk factor is based on the retrieved data and may, for example, include detecting common patterns of a vehicle operation under the same or comparable driving conditions or situations. For example, a vehicle operation scheme may include a driver-specific way of braking (such as a braking pattern) when a specific curve is ahead of the vehicle. Further, the way of braking may be different for different driving conditions which may be recorded as well. Driving conditions may include weather/ambient conditions and/or the type of the vehicle, like a car, a truck, a bicycle, a motorbike, or the like. The braking pattern may be retrieved from the output over time of the G-force sensor installed in the mobile device.

Hence, the claimed method may extract, analyze, store and transmit stored driving information with the aid of a mobile device and cloud analytics, in a very secured and trusted system, such as a remote server farm including the remote computers. The adding of a driver-specific identifier to the retrieved data allows tracking the driver irrespective of the vehicle that is used so that a complete driver behavior profile can be generated which may be used to extract a very accurate risk factor for the specific driver independent of the vehicle that is used, e.g. for insurance premiums, and/or which may be used to extract the "driver DNA"/"driver's fingerprint"/a driver vehicle operation scheme which may, for example, be used for securely identifying a specific driver which can safely prevent fraud, e.g. when another driver should drive the vehicle in order to improve the risk factor of the driver.

The claimed method may further include that a data retrieval session is started automatically when a predetermined condition is fulfilled or determined. A predetermined condition for automatically starting the data retrieval session may be set in advance in the mobile device. For example, if the mobile device detects a moving speed which is higher than the walking speed of a pedestrian or higher than a preset velocity, such as 20 km/h, a computer program product or an "app" installed on the mobile device may automatically start to start the claimed method. The automatic start condition may in addition or alternatively include that geolocation information, such as GPS data, indicate that the mobile device is moving (in the middle) of a street. Further, the microphone of the mobile device may be trained to detect vehicle interior sounds when a motor vehicle is travelling so that this may be a further automatic start condition. Further examples for the predetermined (automatic start) conditions are possible as well.

The data retrieval session may also be started manually by the driver, for example, by starting the respective program on the mobile device (immediately) before starting to drive the vehicle.

A data retrieval session may be linked with a driving session; this means that a data retrieval session may stretch from the start of the operation of the vehicle/the driving until the end of the operation/driving of the vehicle.

The end of the data retrieval session may be determined in the same way as a start thereof, i.e. the driver may stop it manually by, e.g. stopping the program or the data retrieval of the program, and/or the stop may be detected automatically, e.g. when the travelling speed becomes zero for a predefined time duration or the like.

In order to avoid a possible manual stopping of the data retrieval when a critical situation occurs or when the driver wants to drive more risky without increasing the risk factor, the manual stopping of the data retrieval session may be overruled when the vehicle is still operated. Thus, for example, a manual stopping may not be accepted by the program or app when the travelling speed is above a certain value, e.g. 20 km/h, or when the geolocation position is detected to be on a street or the like.

Further, each time before a data retrieval session is started (especially each time before the start of a data retrieval session and particularly preferably immediately before said start), a manual authentication of the driver is performed based on which the driver-specific identifier is set for said/the next/the following data retrieval session. The manual authentication to identify the driver may include using a fingerprint sensor of the mobile device, using a face, retina or the like recognition method, entering a pin code or password, using a voice recognition method, using a breath component recognition method, or the like. The manual authentication is preferably conducted by the mobile device receiving an input (here input may include placing the eye before the camera of the mobile device, breathing into a sensor of the mobile device, and so on) from the driver. If the authentication confirms that the input matches to the driver's information/credentials stored in the mobile device and/or the remote computer, the related driver-specific identifier is set and used throughout the following data retrieval session. The driver-specific identifier may preferably be a number identifying the driver or any other string of characters.

The identifier may be connected, i.e. stored in connection with or pointing to stored information, to information about the person of the driver, residence data, age, sex, etc. In addition, the identifier may be connected to the driver's operation driving schemes and the risk factor of the driver. Preferably, the driver's operation driving schemes and risk factor may be stored dependent on different driving conditions, such as the type of weather. Preferably, the data is stored in the remote computer(s) and is transmitted to the mobile device when requested or needed. However, the data may also (in addition or as an alternative) be stored on the mobile device itself.

The automatic starting and stopping of data retrieval sessions may bring great convenience for the driver who cannot forget it and it may improve the reliability of the data because the driver may not easily skip certain driving situations or entire driving operations by simply not activating the data retrieval session manually. Even further, the manual authentication step enables to select the unique driver identifier and to relate the data retrieved in the following data retrieval session to the specific driver with high confidence so that the mobile device, when e.g. lost or stolen, cannot be used by another person to capture the driver's profile of the original driver. This authentication and the adding of the authenticated "ID" to the retrieved data increases data reliability even further.

Further, according to the claimed method, the retrieved data may additionally be retrieved from data providing units included in the vehicle or by vehicle-external data providing units. This may preferably be enabled when the mobile device is connected to the vehicle in a wireless or wire-based fashion. A connection between the mobile device and the vehicle may, for example, be established by a wireless connection between a computing unit of the vehicle and the mobile device which allows exchange of data that is retrieved by the vehicle's computing unit from vehicle-based sensors and the like. For example, the mobile device may retrieve, when connected to the vehicle, data about the state of vehicle and/or its components, such as temperatures, pressures, configuration, and the like. Vehicle-external data providing units may communicate with the vehicle and/or the mobile device, and, they may comprise intelligent traffic signs and lights, toll stations, other vehicles, etc. The data which may in addition be retrieved by vehicle internal and vehicle external data providing units enables to draw an even more reliable picture about the driver, for example it can be analyzed how quickly the driver starts after a red traffic light turned green, whether the driver tends to drives at high revolutions, whether the driver obeys warnings and notifications from the vehicle, e.g., a warning of low tire pressure, and so on. All this additional data can be used to calculate a risk factor with even higher precision and to identify the driver's operational behavior with higher confidence.

Further according to the claimed method, the retrieved data, irrespective of the retrieval source, may be saved in connection with a time, preferably the actual time, and/or in connection an actual position of the vehicle. In other words and for example, data retrieved about the velocity of the car may be retrieved and saved as a function of the actual time, e.g. the driver was driving 50 km/h at 01:01:30 PM. The geolocation may be saved as well, e.g. as GPS coordinates. The time intervals of retrieving data may be set in advance, e.g. each millisecond, each second, each minute or the like. The data retrieved may be saved in connection with the time and/or location and in addition the driver-specific identifier is added so that the data is clearly assigned to the specific driver. The data may be stored on the remote and/or the mobile device.

Further, according to the claimed method, an automated authentication of the driver may be performed after a predetermined time of operating the vehicle by the driver using historical data. The automated authentication may preferably be performed in addition to the manual authentication that is performed at the start of a data retrieval session. The automated authentication may be performed at a predetermined time after the start of the data retrieval session, which may be a preset time duration, e.g. 1 min, 20 min or the like, or the time be depend on the accuracy of the authentication which may be dependent on the amount of data retrieved during the actual session. In the latter alternative, e.g., a preset amount of retrieved data may be set which activates the automated authentication, such as 1 MB, 10 MB, 100 MB or the like.

Further, the historical data may be analyzed (post-processed) retrieved data of the same driver of previous data retrieval sessions of operating the same or another vehicle which is saved on the mobile device and/or the remote computer. Preferably the other vehicle is the same type of vehicle, such as car, a truck, or so on, i.e. preferably the historical data and actual data are compared for same vehicle types which may increase the authentication result because the driver may behave differently when riding a bike than when driving a car.

The retrieved data of the driver operating the vehicle since the start of the actual data retrieval session may be compared to the historical data in order to determine whether the data (or a part of it) matches with each other so that it can be confirmed that the driver is indeed the driver who has performed the manual authentication. In this way it can be reliably avoided that the driver passes login credentials for the manual authentication to another person who is then driving under the driver-specific identifier of the driver to whom the identifier belongs. This ensures maximum reliability of the post-processed retrieved data, such as the risk factor, and thus a fraud-safe system is provided on which e.g. insurers can rely when it comes to calculating insurance premiums for a specific driver.

Further, in case it is determined that the data of the automated authentication match, data retrieval and data analysis is continued in the actual session. Otherwise, a notification may be issued, the data retrieval session may be stopped and/or the data retrieved so far during the actual data retrieval session may be deleted. Instead of deleting said data, it may also be disregarded for the further driver behavior analysis but it may be processed and used for other purposes, such as if the car was stolen, the data may be used for identifying the driver who drove the car (in case the authorities can access the central data base).

Further, in view of the predetermined time or amount of retrieved data before starting the automated authentication, it may be a further preferred option to allow a predefined number of failed automated authentications before the actual data is indeed deleted and the retrieval stopped. In this way it may be taken into account that the automated authentication is becoming more and more accurate the more data is retrieved in the actual data retrieval session. For example, it may be allowed to have three failed automated authentications before the data retrieval is stopped and the actual data is deleted. Most preferably it may also be an option to have the automated authentication (additionally or alternatively) at the end of the data retrieval session, e.g. after the vehicle was stopped.

Moreover, if the authentication has revealed that the wrong driver is driving, it may be a further option to continue data retrieval and to not delete the so far retrieved data, which is then however marked specifically, e.g., as data that is not relevant to the calculation of a risk factor, a driver behavior pattern or the like.

Further, the historical data, which is used for the automated authentication, may include driver-specific vehicle operation schemes including patterns, clusters and/or bands which are specific to the driver.

The patterns, clusters and/or bands may be updated by newly retrieved data each time the driver starts a further driving session. The patterns, clusters and bands may be calculated specifically for a specific driver and, in addition, these vehicle operation schemes of the driver may be preferably calculated and stored connected with specific driving conditions. In other words, the patterns, clusters and/or bands may not only be calculated for a specific driver, but also for one or more driving conditions. The driving conditions may be defined in advance, and they may include the type of the vehicle class, such as car-class, truck-class, and the like, it may further include weather conditions, such as rain, snow, darkness, etc. The condition may further include the vehicle conditions, heavily loaded or not, new or old tires, last maintenance service, etc. Further the conditions may include the actual condition of the driver, such as tired, stress, relaxed or the like. The driver condition may be asked in an additional step before or after the manual authentication takes places.

Accordingly, the driver-specific identifier may be linked to driver-specific operation schemes, such as patterns, clusters and/or bands, and the driver-specific operation schemes may further be linked to specific driving conditions. In other words, patterns, clusters and/or bands may be calculated only for the driver irrespective of the driving conditions or they may be calculated for a specific driver and one or more driving conditions. For example, the driving scheme of the specific driver may be saved for this driver driving during sunny, dry weather, during snowfall, during rain, and during darkness.

The automated authentication thus ensures maximal reliability of the authentication result and a differentiation not only between different drivers but also between different driving situations.

The driver-specific patterns may be generated by plotting output values of one or more data providing units over time (or over the driving distance), by dividing the plotted curve of output values in one or more driving sectors and by extracting driving-specific information, such as the shape of the plotted curve of output values over time, the gradient of the curve, or the like, for each driving sector. In other words, it is a preferable option to analyze the driving scheme of the driver for predefined road sectors, such as curves, straight road, narrow roads, highways, tunnels, etc. Therefore, the plotted curve is divided into the respective sectors and the information about where to start and end one sector may be derived from geolocation information and maps and/or vehicle external information, such as highway toll stations, tunnel sensors or the like. As soon as a sector is detected, additional information about the driving conditions, as described above, may be added so that it is possible to extract driver-specific patterns of one driver for, e.g., a S curve road sector and separately for each driving condition, such as for sunny weather conditions, for rainy weather conditions, for a stressed driver condition, and so on.

The driving-specific information which relate to as to how to form a sector may be predefined. E.g., a data table may define that a sector is extracted for specific curves, for specific streets, for tunnels, for specifically inclined roads, and the like. Therefore, each time the driver is travelling on such a specified part of a travel path, the analysis may define a sector accordingly and track the driver's operating scheme so as to update the pattern for the specified sector. This allows that the driver's specific driving scheme will be identifiably based on his very own operational scheme in, e.g., an S curve. In order to improve the accuracy, the driving conditions may also be taken into account.

The driving pattern, for example, may be recorded/plotted by retrieving data from one or more sensors of the mobile device, such as the G-force sensors. These sensors of the mobile device, e.g., can record the decelerations and accelerations of the vehicle within the S curve. The resulting recorded pattern/curve of decelerations and accelerations can be used for identifying the driver. The accuracy of the identification is even higher when the output of a plurality of data providing units is used, so that in the above example of the S curve not only the G-force is recorded but in addition the steering angle of the vehicle, the speed of the vehicle, the exact lateral location of the vehicle on the street, etc.

In addition or alternatively to driver-specific patters, the output values of one or more data providing units may be plotted so as to form clusters. The clustering of the data providing unit output values may, e.g., include that identical values of a data providing unit are plotted on top of each other. For example, if the acceleration sensor output value is 1.5 G for a given time period, the cluster plotting will only plot one single point. The clustering can be performed for the output of many different data providing units, and, more preferably, the values are normalized so that a compact representation can be realized. Further, for example, when the clustering was performed for a certain time period, e.g. one month, one year or the like, it will be found that certain values of certain data providing units are plotted more often than other values. This is a characteristic of the driver. For example, a driver living in a city where the general speed limit is 50 km/h and the driver being a speedy driver, may have cluster for the speed sensor output which is around 65 km/h or 60 km/h, and the cluster may also include that the acceleration values of the G-force sensor are clusters around a relatively high value. Even further, the clustering can be carried out in view of the external conditions and driver conditions, as already described in connection with the driver-specific patterns. Even further, it may be another preferable option, alternatively or in addition to monitoring a time span continuously, that clusters are formed for specific time or driving way sectors. This may mean, for example, that clusters are formed for specific (predefined) sectors of a street or the like.

In addition or alternatively to the above described patterns and clusters, driver-specific bands may be generated by plotting output values of one or more data providing units over time (or over the driving distance) and by saving a minimum value and a maximum value of the output values for each driving sector. In other words, instead of comparing the curve or the shape of the curve, as it was explained for the patterns above, the bands may, in the least complex variant, track a minimum and a maximum for each sector.

The comparison of the patterns, clusters and/or bands may be carried out during the real-time analysis of the retrieved data and a match can be defined to require identical actual and historical patterns/clusters/bands or to require that the actual and the historical patterns/clusters/bands may not deviate from each other by more than a predefined allowable deviation, such as ±5%, ±10% or the like.

Further, according to the claimed method, a risk analysis of the authenticated driver may be performed during and/or after each data retrieval session based on the retrieved data and historical data in order to calculate the driver-specific safety/risk factor. A result of the risk analysis, in particular the driver-specific risk factor, may be stored in the mobile device and/or the remote computer, wherein an existing result of the risk analysis may be updated based on the actual risk analysis.

Preferably, the risk analysis includes using predefined evaluation curves for one or more output values of data providing units and optionally for one or more driving sectors, one preferred shape of an evaluation curve may be applied for a coordinate system in which the y-axis indicates a risk value and the x-axis indicates time or distance. The preferred evaluation curve may have a section of constant y-values, more preferably with y=0, which may start at x=0. The evaluation curve further may have the constant y-values section up to a predefined boundary value of x. Starting at the boundary value or directly for x-values being greater than the boundary value, the preferred evaluation curve may have a section with falling or rising y-values. A maximum or minimum y value may be set at the x-value of the occurrence of a predefined situation.

The boundary value may be predefined based on predefined driving situations. For example, the boundary value may be set for a driving situation in which a curve lies ahead the vehicle. The occurrence of the predefined situation may then be the start of the curve. The boundary value may then be set to be a fixed value which, in terms of safety, may be an (extremely) conservative value. For example, it may be defined that the boundary value is defined to be 200 m or 30 s before the start of the curve. However, the boundary value may also be defined relatively, e.g., it may be defined that the boundary value, when a curve is detected in the driving path ahead, is calculated based on the actual speed limit, and the distance required for stopping the vehicle at this speed when an average (no emergency braking and no light braking) braking force is used.

Further, the boundary values may be differentiated based on a learning curve of the driver. For example, if the driver improves the driving style and the boundary value is not exceeded within a predefined period of time, the boundary value may be set less conservative. Otherwise, if the driver is detected to have a risky driving style, the boundary values may be shifted to a more conservative value, e.g. so that earlier braking is requested or the like. This adaption may further take into account the environmental and contextual conditions, for example, weather condition, road type (e.g., urban, motorway), traffic signs and rules. Alternatively or additionally, if clusters of the driver's driving behavior are determined, the boundary value(s) may also be adapted to the cluster of the driver.

Then, each time such a predefined driving situation, such as curve ahead or a stopped car ahead, is detected or occurs, the actual output values of one or more data providing units are mapped onto the respective evaluation curves and the actual y-axis value is retrieved. For example there may be an evaluation curve for a braking action for which the G-forces detected by the respective sensor of the mobile device are used. It may then be detected at the occurrence of the predefined driving situation when (timewise or distance-wise) the driver starts braking, detected by the G-forces varying accordingly, in relation to the start of the curve ahead. If the driver hits the brake after the boundary value, i.e. at an x-value which is greater than the boundary value, the evaluation curve will output a risk value which is greater than 0. Therefore, at each driving situation, the driver may avoid increasing a risk value when he steers, brakes or the like before the boundary value. If however the driver (as an extreme) will always be behind the boundary value, the driver will accumulate increasing risk points/the risk value will increase at every predefined situation. The risk value may be tracked separately for different driving situations, such as curve ahead, a stopped car ahead, and the like. Further, the risk value calculation and evaluation of the driver's driving behavior in view of taking risks and driving more/less risky, respectively, may take into account the driver's environment, such as regional traffic rules, weather conditions, and/or limits of autonomous vehicle safety limits. For example, the evaluation curve and/or the boundary value may be shifted or stretched/compressed in the x- and/or y-direction when specific environmental conditions apply. In this regard it may be one example that the evaluation curve is shifted so that higher risk values are output when it is raining or icy compared to dry driving environmental conditions.

In other words and consequently, the retrieved y-axis values are merged with previously retrieved values and so it becomes possible to determine a driver-specific risk factor for the authenticated driver which adapts over time.

However, in order to give the driver the chance to improve his driving style, a real-time feedback may be output to the driver while driving including the risk factor and/or a notification when boundary values were exceeded.

Further, according to the claimed method, the data retrieved and the post-processed data of a driver, including the risk factor of the driver stored on the remote computer, can be accessed by a person different to said driver if said driver has authorized said person, preferably via an input/output device. Said input/output device may preferably be the mobile device. Another device, such as a computer, may be used as input/output device, too. The authorization may be performed by selecting specific data, such as the risk factor of the driver for a selectable time frame, on the mobile device and defining that the selected data shall be accessible for a selectable different person, such as an insurance company or the like. The driver may set login credentials which he may transmit to said other/different person. This allows the driver to share the data however only when the driver has authorized the sharing, and for a limited time. The driver should be able to be notified when there someone is accessing his profile/data including a timestamp. For example, a notification may be received by the driver via the input/output device when there is an access to his profile or data.

The claimed subject-matter may further include a computer program product which is enabled to be operated on a mobile device and/or within an OS of the vehicle and being configured to carry out the above described method. Further, there may be provided a mobile device having the computer program product installed thereon so that it is configured to carry out the above described method. It is noted that the above-outlined aspects may be performed in any apparatus comprising a processor. Computer program instructions being stored on a computer memory may perform the aspects when executed by the processor. The above-described steps/aspects of the method may also be performed by a computer program product or app in a vehicle or in a computer readable medium for use in a data processing system.

BRIEF DESCRIPTION OF THE DRAWINGS

In the following the invention will be further explained based on at least one preferential example with reference to the attached exemplary drawings, wherein.

EMBODIMENTS

Figure 1:
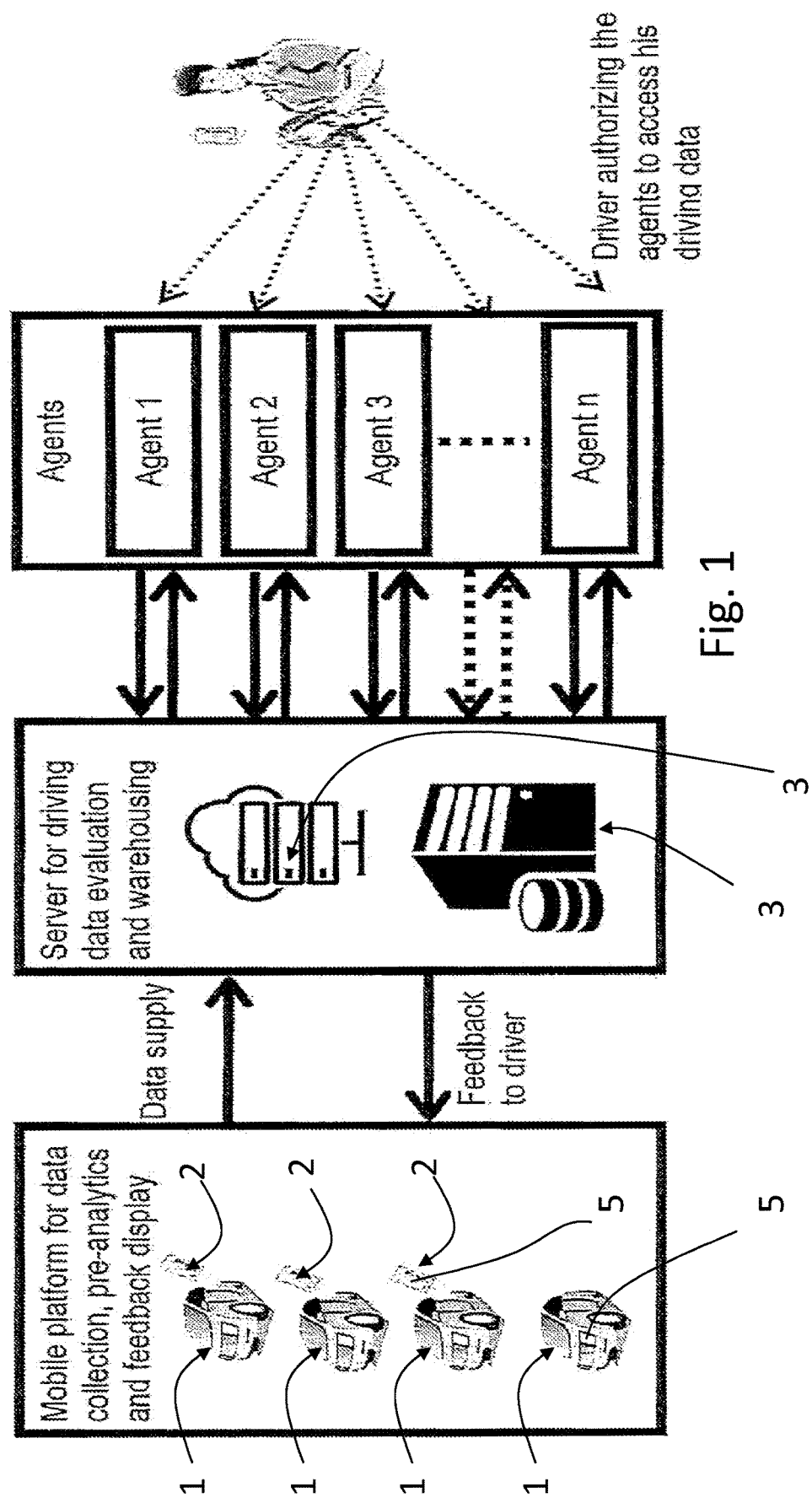
FIG. 1 depicts an overview of possible data flow related to the claimed method.

While the above describes a particular order of operations/steps performed by certain preferred examples of the invention, it should be understood that such order may be exemplary, as alternative examples may perform the operations in a different order, combine certain operations, overlap certain operations, or the like. References in the specification to a given example indicate that the example described may include a particular feature, structure, or characteristic, but every example may not necessarily include the particular feature, structure, or characteristic.

It should be further noted that the description and drawings merely illustrate the principles of the proposed methods and devices. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting examples, principles, aspects, and embodiments of the invention, as well as specific examples thereof, are intended to encompass equivalents thereof.

Furthermore, it should be noted that steps of various above-described methods and aspects thereof and components of described systems may be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The examples are also intended to cover computers programmed to perform said steps of the above-described methods.

In addition, it should be noted that the functions of the various elements described in the present document may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "computing unit" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

Further, the term "mobile device" may encompass, for example, smartphones, tablets, notebooks, and in general portable electronic devices. The term vehicle may encompass, for example, cars, transporters, trucks, bikes, bicycles and, in general, street-type vehicles. However, the term vehicle may also encompass other types of vehicles, such as trains, ships, boats and the like.

Now it is referred to FIG. 1 which shows some general aspects of the claimed method and the data flow according thereto. On the left hand side of FIG. 1 it is schematically indicated that a driver may use different vehicles 1, which are cars in this example, and a smartphone, which is exemplarily selected as a mobile device 2 according to the claimed method. The car/vehicle 1 and the smartphone/mobile device 2 may include one or more data providing units 5, such as sensors. When driving, the smartphone retrieves data from internal sensors of the smartphone, such as G-force sensors, temperature sensors, pressure sensors, GPS or other geolocation modules and the like. The retrieved data is post-processed within the smartphone's computing units, such as the CPU, the GPU, or the like. The post-processing within the smartphone's computing resources includes at least saving the data to the smartphone's internal data storage and transmitting the data to a remote computer 3. This transmission is depicted in FIG. 1 by the arrow "data supply". The post-processing within the smartphone may however also include analyzing the retrieved data in view of calculating risk factors of the driver in real-time or analyzing driver-specific driving operation schemes. If the latter described (heavy) analysis of the retrieved data would however consume a major part of the smartphone's computing resources or would require more computing power than the smartphone has available, the heavy analysis is carried out in the remote computer(s) 3, e.g. by cloud computing, which may be placed in a server farm or the like. The data is transmitted from the smartphone to the remote computer(s) 3 via wireless communication technology, including WiFi, 3G, 4G, 5G and the like.

As further depicted in FIG. 1 the post-processed data anaylzed in the remote computer 3 may be, at least partially, send back to the smartphone, e.g. in order to provide a feedback to the driver. The data which is send back may include the actual risk factor of the driver, warnings or notifications when the driver is driving risky, and so on.

The retrieved data which is supplied/transmitted from the smartphone/mobile device 2 to the remote computer 3 is sent together with a driver-specific identifier 4 which allows to store the data in connection with the specific driver. The data being stored, e.g. in the remote computer 3, about a specific driver may be accessed by other/third parties, which are exemplarily depicted as agents or insurance agents in FIG. 1. It is further shown in FIG. 1 that the access to the personal data of a driver may only be granted after the driver has authorized the access. The authorization may be carried out by the driver by selecting data and a specific other/third person/entity which shall have access to the selected data. The driver may then create a password or other authentication credentials which he may inform to the third party with which the third party can access the driver's selected data. The access may most conveniently be possible via an internet connection to the remote computer 3 which stores the data. In an alternative, the access may be granted on the mobile device 2 when the driver receives a request from the other/third party.

Figure 2:
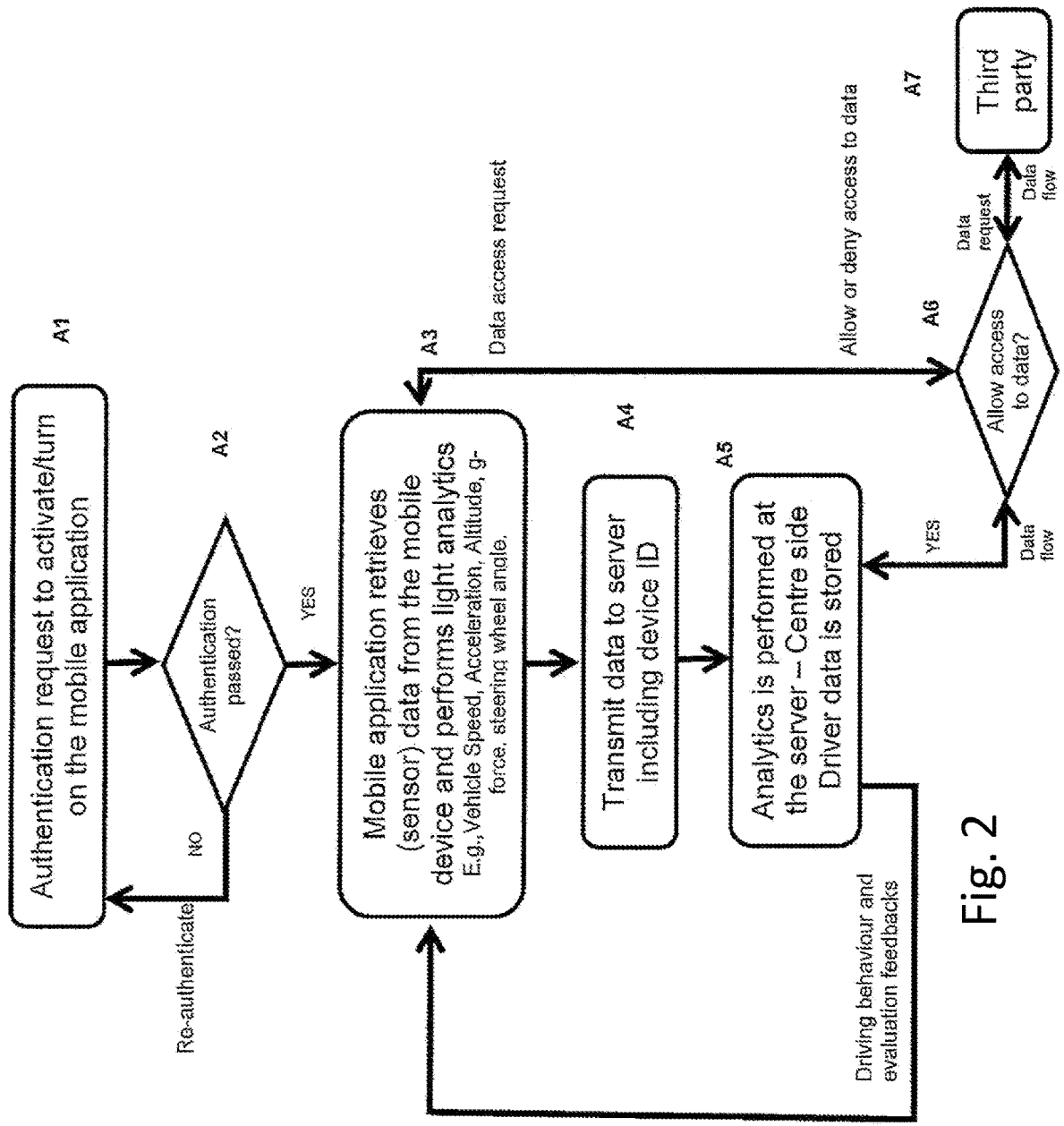
FIG. 2 depicts a diagram of method steps related to the claimed subject-matter.

FIG. 2 shows a schematic of aspects/steps of the claimed method according to a preferred example of the invention. When the driver has entered the vehicle he may place the mobile device 2, in the following it is again exemplified by a smartphone, at a position which prevents slippage, turning or any other movement of the smartphone during the following driving. In a preferred alternative example, the driver may also establish a connection with the vehicle, especially the vehicle's computing unit, OS or the like, by a wire or wireless. If the driver does not establish a connection to the vehicle, the entire process of analysis, which is described in detail below, will rely on data which is retrieved from smartphone internal data providing units 5, such as the smartphone's sensors, and data which is retrieved by the smartphone from external data providing units 5, such as intelligent traffic signs, geolocation signals and the like. If however the smartphone is connected to the vehicle, the additional data providing units 5 which are mounted to the vehicle 1 can provide output which is retrieved by the smartphone and used for analysis of the driver.

As soon as the driver activates the here described computer program or mobile application ("app") on his smartphone a first step A1 is that the driver is asked to authenticate himself/herself manually. The activation may also be linked together with an authentication request as, for example, noted in step A1 of FIG. 2. In the first step A1, the authentication may require that the driver uses the fingerprint sensor of the mobile device, that the driver places his face, his eyes or any other body part in front of the smartphone camera so that it is visually recognized, that the driver enters his/her voice into the microphone and/or that the driver enters a key or password or key pattern or the like. After the authentication was determined to be successful in step A2, the data retrieval and analysis may start. However, if the authentication fails, the authentication request is repeated. The number of repetitions may be unlimited or limited to a predetermined number, such as 1, 2, 3 or more.

After the successful completion of step A2, the data retrieval session starts immediately with collecting the output of the different sensors and other data providing units 5 (step A3) which are related to the driving operation. In one example, the data retrieval of step A3 may only include detecting accelerations and decelerations via G-force sensors of the smartphone and combining this data with the time and location of the vehicle. In other examples, the data retrieval may include much more sensors, such as temperature sensors, pressure sensors, speed detection sensors, and, if the mobile device 2 is connected to the vehicle 1, data about steering angles, brake pedal pushing, gas pedal pushing, engine revolutions, and the like. However, if the smartphone is completely replaced by an app installed on the vehicle OS, it may be possible that the data retrieval may only rely on vehicle-owned and vehicle external data providing units.

Figure 9:
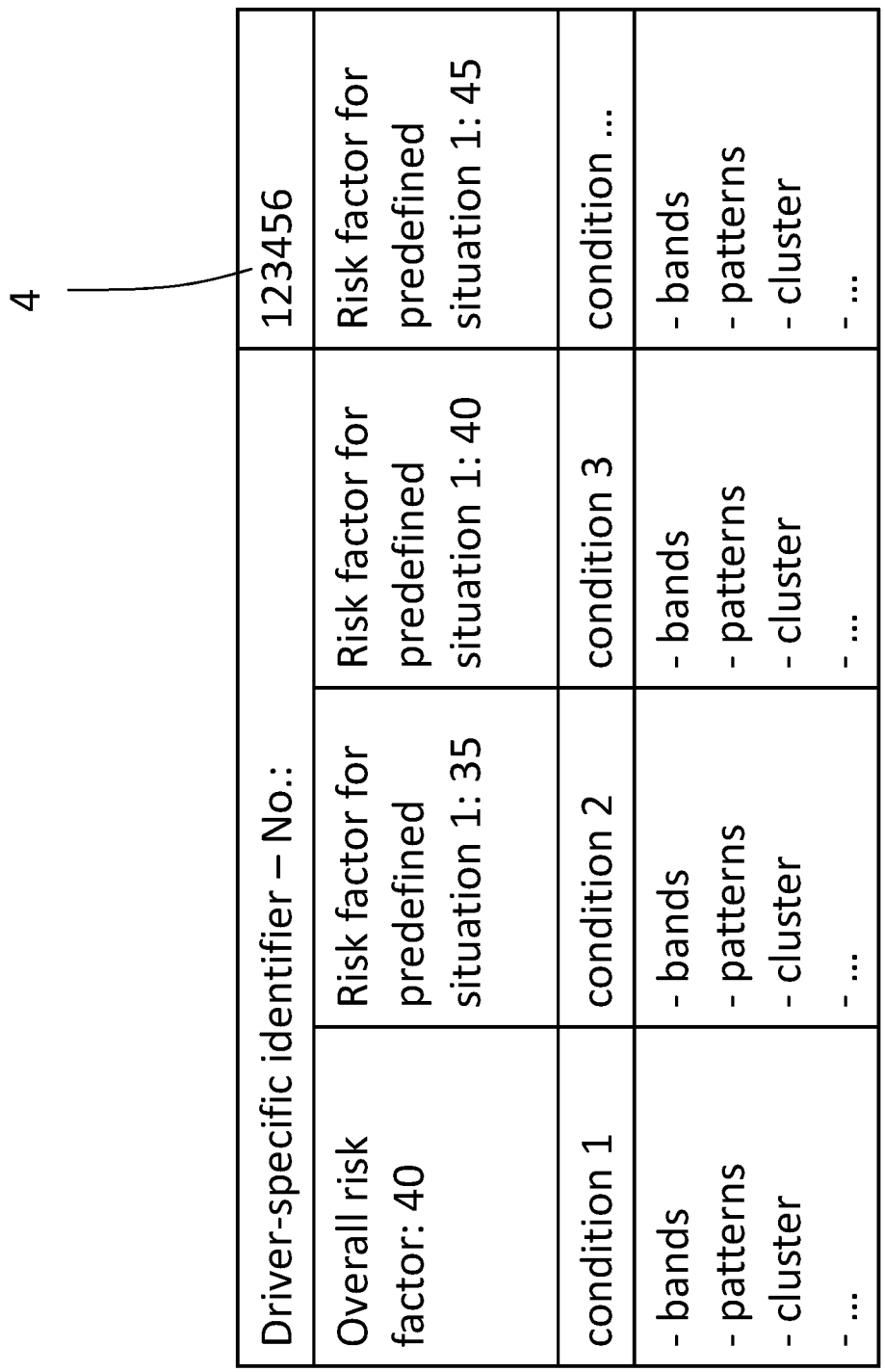
FIG. 9 shows a data format usable in connection with the claimed method.

Further, in step A3 the smartphone may already perform analytics of the data retrieved, however, it may also transmit the data to the remote computer 3 as indicated by step A4. The transmission importantly includes the data retrieved as well as a driver-specific identifier 4. The driver-specific identifier 4 may be connected to his/her mobile device 2 and thus be a device ID (as for example shown in FIG. 2) or it may be an identifier which is identifying the driver himself/herself. FIG. 9 shows an example of the driver-specific identifier 4 in connection with a possible data format for saving personal information about the driver, including the driver-specific identifier 4 and further information that is described further below, such as driver-specific operation schemes, like bands and patterns p.

In a next step A5 the data received at the remote computer 3 is analyzed and stored to the driver's personal file, folders or in general to a personal storage space reserved for the driver. The analyzed data may also be sent back to the mobile device 2 to store a local copy thereof on the mobile device 2.

Further, the analysis result is transmitted from the remote location to the smartphone so as to give a feedback to the driver about the driving performance, especially for warning the driver about risky driving or the like.

Furthermore, preferably, a different/third party may be granted access to the driver's data stored in the remote computer 3 or to the real-time data retrieval. This is shown by steps A6 and A7 in FIG. 1 during which the driver is asked for granting access. This may happen by sharing login credentials with the third party or by activating/accepting data submission to the third party when the driver receives a request from the third party.

Especially steps A3 to A5 may be repeated many times during a data retrieval session and the repetition rate may be below some few seconds or milliseconds or may be up to several minutes. In particular step A3 may preferably repeated within short time intervals, such as few milliseconds or seconds. In some repetition cycles it may also be defined that step A3 is performed without steps A4 and A5 so that, e.g., only every second, third, or more repetition the further steps A4 and A5 are performed.

The process is terminated, i.e. the data retrieval session is closed, when a predetermined condition occurs, such as a stoppage of the vehicle for more than a few minutes or the like. The data retrieval session may also be terminated when the driver exits the vehicle 1, disconnects the mobile device 2 from the vehicle 1 or the like.

Moreover, the start of the data retrieval session or the application may be automated, e.g. when the mobile device 2 is connected to the vehicle 1, the application may start and proceed with step A1. Alternatively or in addition, the start may be caused by the mobile device 2 being moved with a velocity that is unusual for a pedestrian, e.g. more than 20 or 30 km/h. Providing an automatic start function, the driver may not circumvent data retrieval if the driver does not want to be tracked when risky driving or the like is intended or happens.

Figure 3:
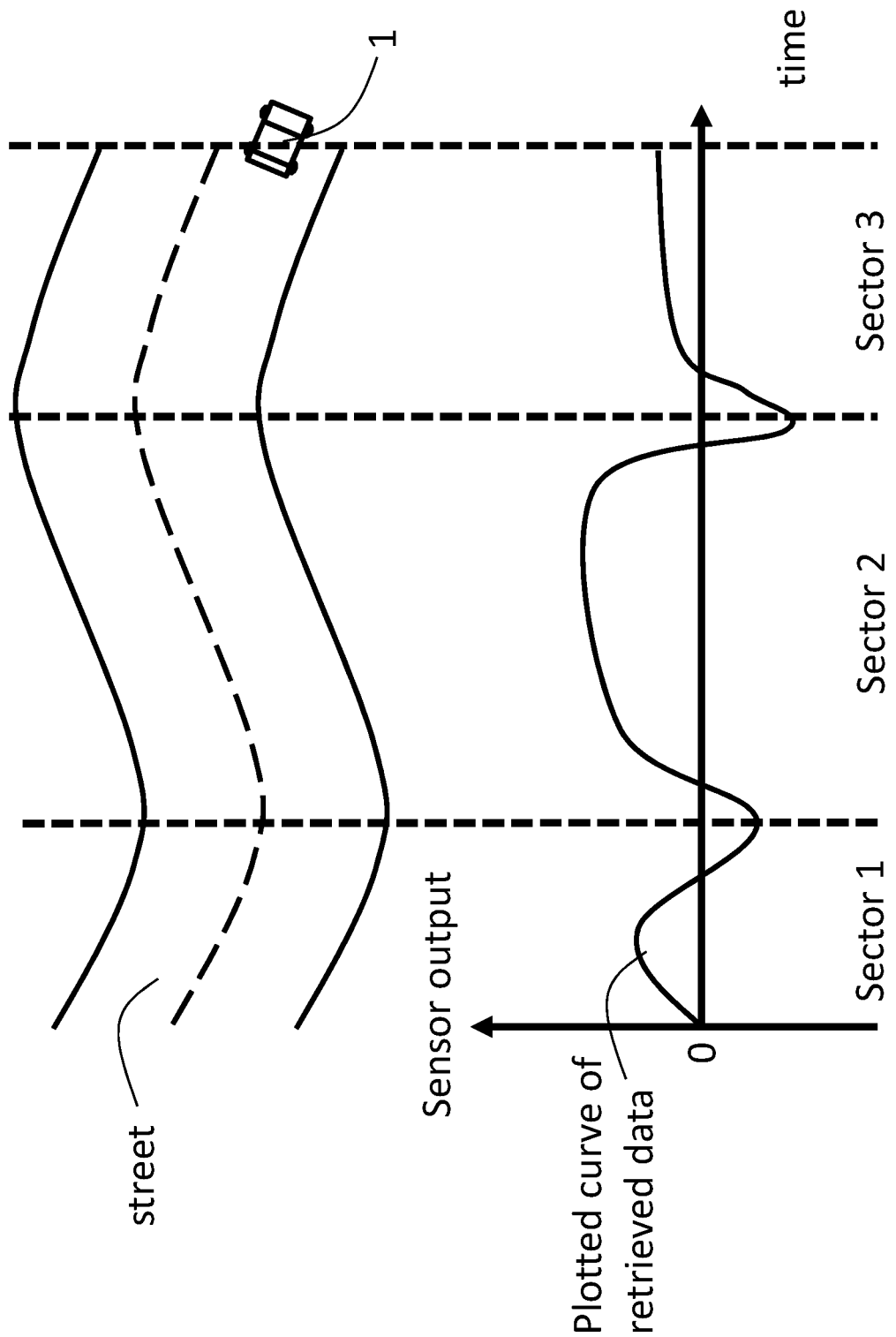
FIG. 3 depicts an example of post-processing retrieved data related to the claimed subject-matter.

FIG. 3 exemplifies as to how data analysis is preferably carried out by the claimed method. It shows that data is retrieved (step A3) and plotted over time so that a curve of sensor output values is drawn as shown in the lower part of FIG. 3. The x-axis shows time, however, it may also indicate a position or distance, e.g. in meters. The sensor output values are mapped to a position of the vehicle on a street. The information may be received from geolocation signals and maps. In FIG. 3 it is assumed, for example, that the vehicle 1 travels on a street with an S curve (as shown in the upper part of FIG. 3). The indicated position of the vehicle 1 in FIG. 3 is merely for improving the understanding, however, it shall be understood that the data curve as shown in the lower part of FIG. 3 is based on data retrieved from a sensor for the time when the vehicle 1 traveled from the beginning of the S curve at time x=0 to the end of the S curve. For an S curve a lookup table or any other storage means may indicate that an S curve shall be divided into three sectors, wherein each sector may be defined to end/start at the apex of each bend of the S curve. Of course this is only an example and it may also be defined that the S curve is not divided into three sectors, but only consists of a single sector or more than three sectors. However, in the present example, three sectors are assumed and they are indicated by the thick broken line.

Figure 4:
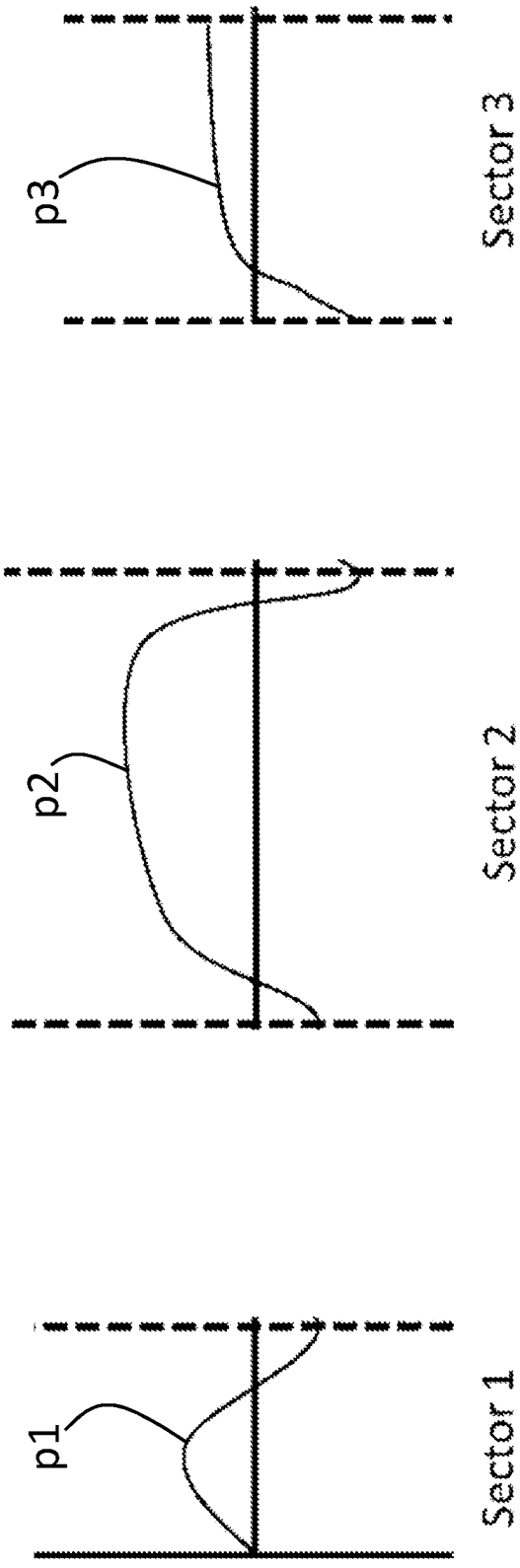
FIGS. 4a-4c depict driver-specific vehicle operation patterns for different driving sectors related to the claimed subject-matter.

Now proceeding with this description to FIG. 4, one can see that the sensor output value curve for each sector of the S curve of FIG. 3 has a specific shape or pattern p1-p3. In this example, the output values may indicate the acceleration or deceleration recorded via one or more G force sensors of the smartphone. The output values may also be velocity or the value of another data providing unit 5. FIG. 4a shows that the driver in sector 1, which is located before the first bend of the S curve, accelerates (if now acceleration is assumed as the output value for this exemplary description) on the straight road until he discerns the curve ahead. The driver then decelerates till the apex of the first bend, which is also the end of the first sector. The resulting pattern p1 of sector 1 is extracted and stored under/together with the driver-specific identifier 4, and optionally together with the driving conditions at the recording time. The driving conditions may include the weather, the properties of the street, such as inclined, narrow, or the like, the traffic congestion, the ambient light conditions, the vehicle type and so on. The driving conditions may be received from vehicle external and internal information providing units 5, such as weather reports, rain sensors of the vehicle 2, temperature sensors, etc.

The pattern p1 may be stored as mentioned above and each time the same driver passes the sector 1 of any such S curve again, the new pattern p1 is merged with the historical pattern p1 recorded before so that an average pattern p1 for the specific driver for the specific S curve sector and preferably specific driving conditions is generated which expresses something like the driver "DNA or fingerprint". This pattern p1 may then be compared to actual patterns p1 when it comes to authenticating the driver automatically. This will be described further below.

FIGS. 4b and 4c show further patterns p2 and p3 for the other two sectors of the exemplarily S curve and they are post-processed in the same way as described above, i.e. especially the data values are extracted sector-wise and may be combined with additional information such as the driving conditions and the driver-specific identifier 4. Of course, further post-processing or mathematical operations may be performed such as smoothing the patterns p, extracting further information, such as gradients and the like, which may improve the data storage and/or the later comparison.

Figure 5:
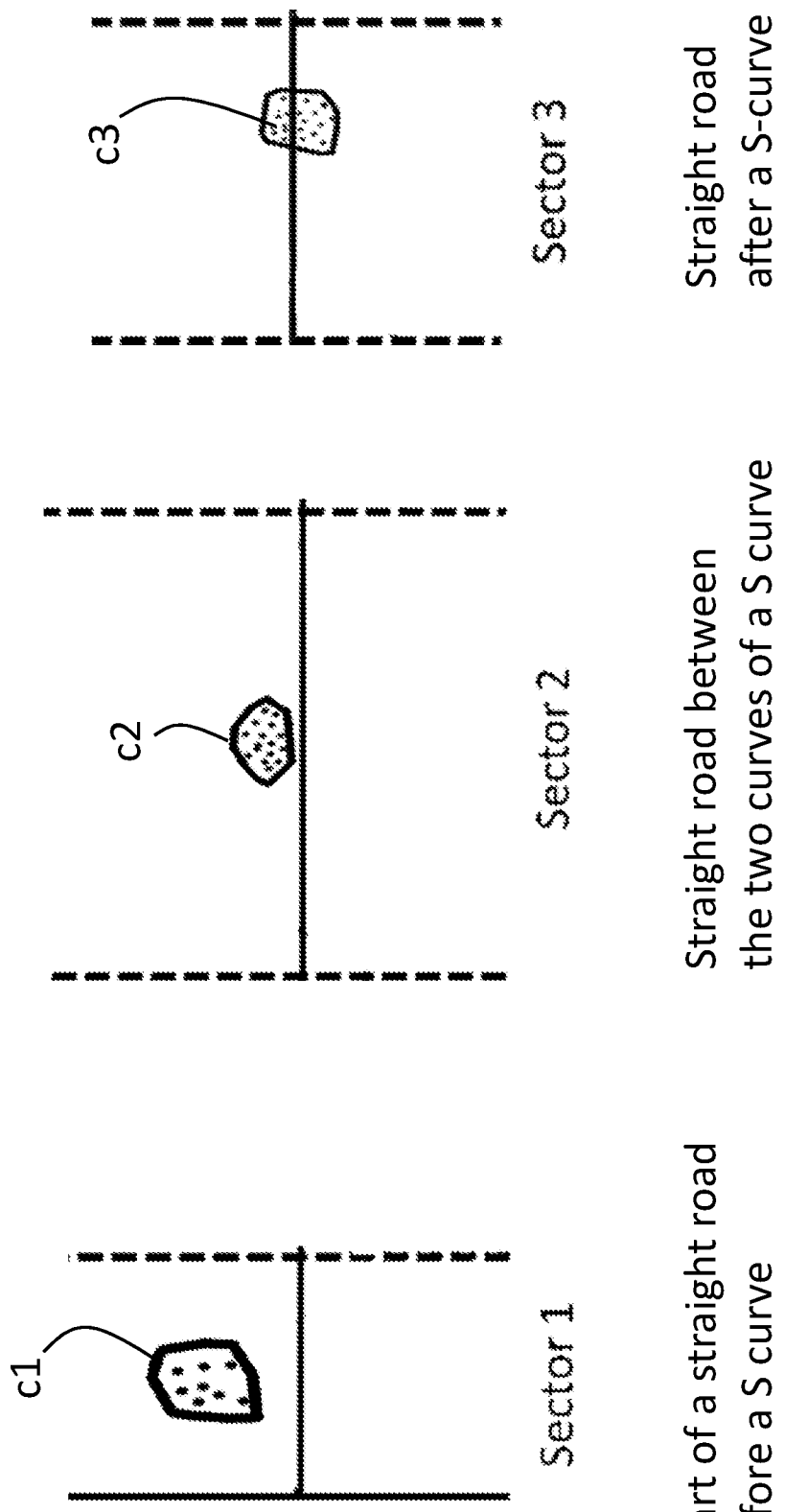
FIGS. 5a-5c depict driver-specific vehicle operation clusters for different driving sectors related to the claimed subject-matter.

In a further analysis as shown by FIGS. 5a to 5c an example of clustering is shown. In the depicted examples of said Figures the clustering is shown for the sectors 1 through 3 which were described in connection with FIGS. 3 and 4. However, before going into detail, it is noted that the clustering in a sector-divided manner as shown by FIGS. 5a to 5c is an example, and, alternatively or in addition, the clustering may also be carried out without taking care of sectors, driving distances, time and so on. In other words, the clustering may also be carried out continuously, which means that the whenever the driver continues driving the clustering is continued starting where the clustering was interrupted before (e.g. when the driver stopped driving). Now, coming back to the depicted examples of FIGS. 5a to 5c, a general way of the clustering is explained. As it can be seen from all FIGS. 5a to 5c sensor or data providing unit 5 output values are simply plotted, e.g. on the y-axis as shown. If a value appears more than one time, a cluster c will not change because the value is plotted onto the same value as a value before. Optionally, however, a weighing can be introduced to make the spot thicker where values are plotted more often. Plotting each value which is output by a data providing unit 5 a cluster c of plotted spots, as shown in FIGS. 5a to 5c, is generated. This cluster c, c1, c2, c3 of all spots, or at least of a plurality of spots which are located close to each other, is indicated by a thick line in the FIGS. 5a to 5c (see reference signs c1 to c3) and the shape of the area/cluster c which is contained within the thick line surrounding the spots can be used for a comparison. For example, the historical shape of a specific driver can be compared to the shape of the cluster c of an actual driving session, and it can be determined whether the shapes match with each other (sufficiently). This can be used for the automatic authentication of a driver. As mentioned above, the cluster c may be generated for a driver without any relation to the driving time, driving place, driving distance or the like and/or it may be generated, as shown in the FIGS. 5a to 5c, for specific driving sectors or other predefined driving situations. Moreover, in any alternative, the clusters c may also be generated depended on driving external or driver conditions, such as weather or driver's fitness level or the like.

Further, in view of the clustering, if the output values of different data providing units 5 are normalized, it is possible to plot these normalized values onto the same graph or into the same cluster diagram, respectively, so that the cluster may not only cover the information of a single data providing unit 5 but of a plurality and of different types thereof.

Figure 6:
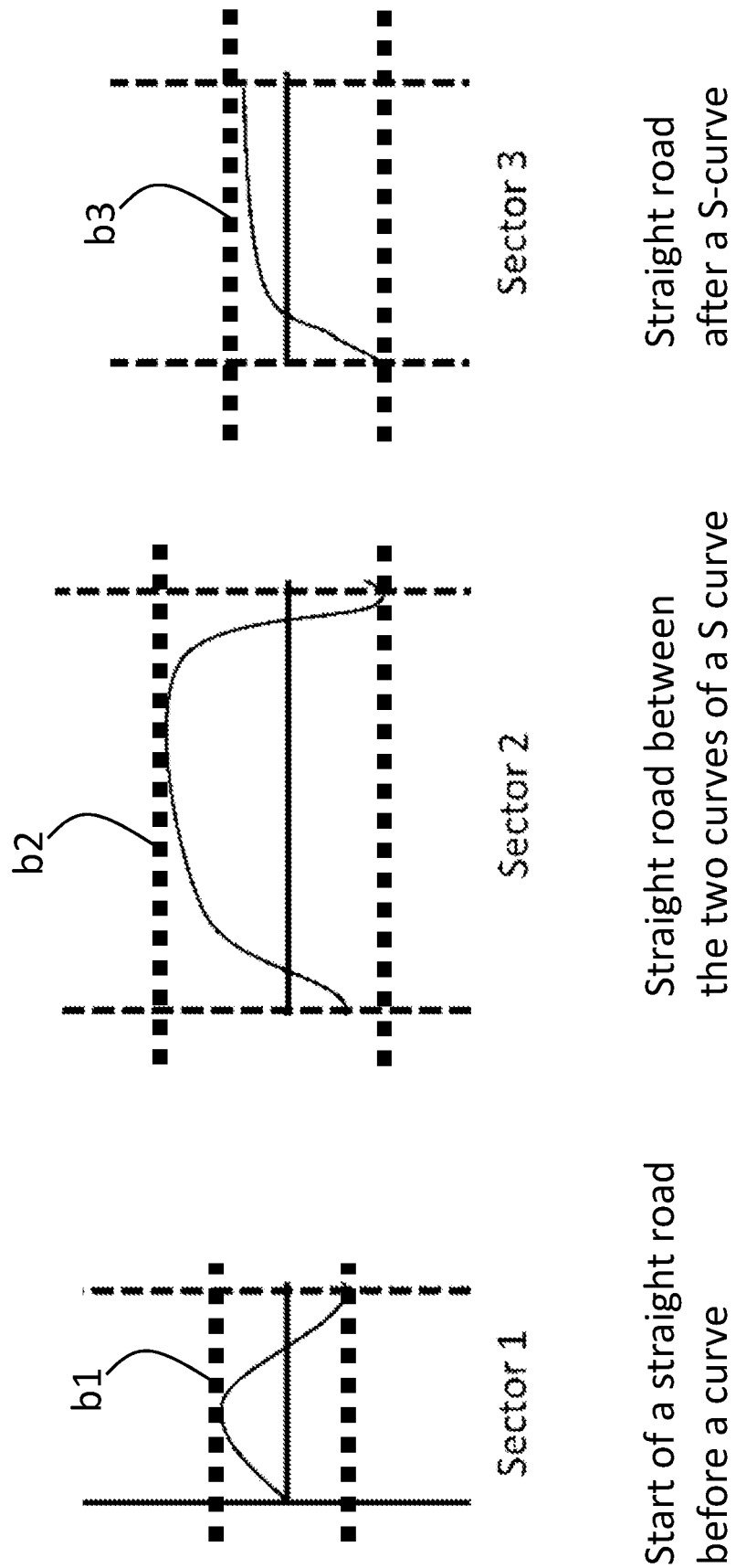
FIGS. 6a-6c depict driver-specific vehicle operation bands for different driving sectors related to the claimed subject-matter.

In a further analysis as shown by FIGS. 6a to 6c, driver-specific bands b may be determined which are extracted in the same way as the above-described patterns p, however, instead of extracting the pattern p of the output value curve, the minimum and maximum for each sector is extracted and saved. This results in bands b1-b3 which are shown in FIGS. 6a to 6c by the thick dotted lines. The bands b may be adapted over time each time the same driver passes a same sector again so that, for example, an average is found which is specific for the driver.

In the above description it was explained that patterns p and bands b are determined which are specific for a driver. This was explained for a single sensor, such as the output of a G force sensor of the smartphone. The accuracy of the driver's identification may be enhanced by using more than one sensor so that, e.g., patterns p and/or bands b for the S curve with the three sectors may not only be based on G force sensor values but in addition patterns p and/or bands b may be generated which are based on steering wheel angle sensors, speed sensors, and the like. The more sensors are involved, the more unique the picture will become so that a driver can be more accurately identified.

Figure 7:
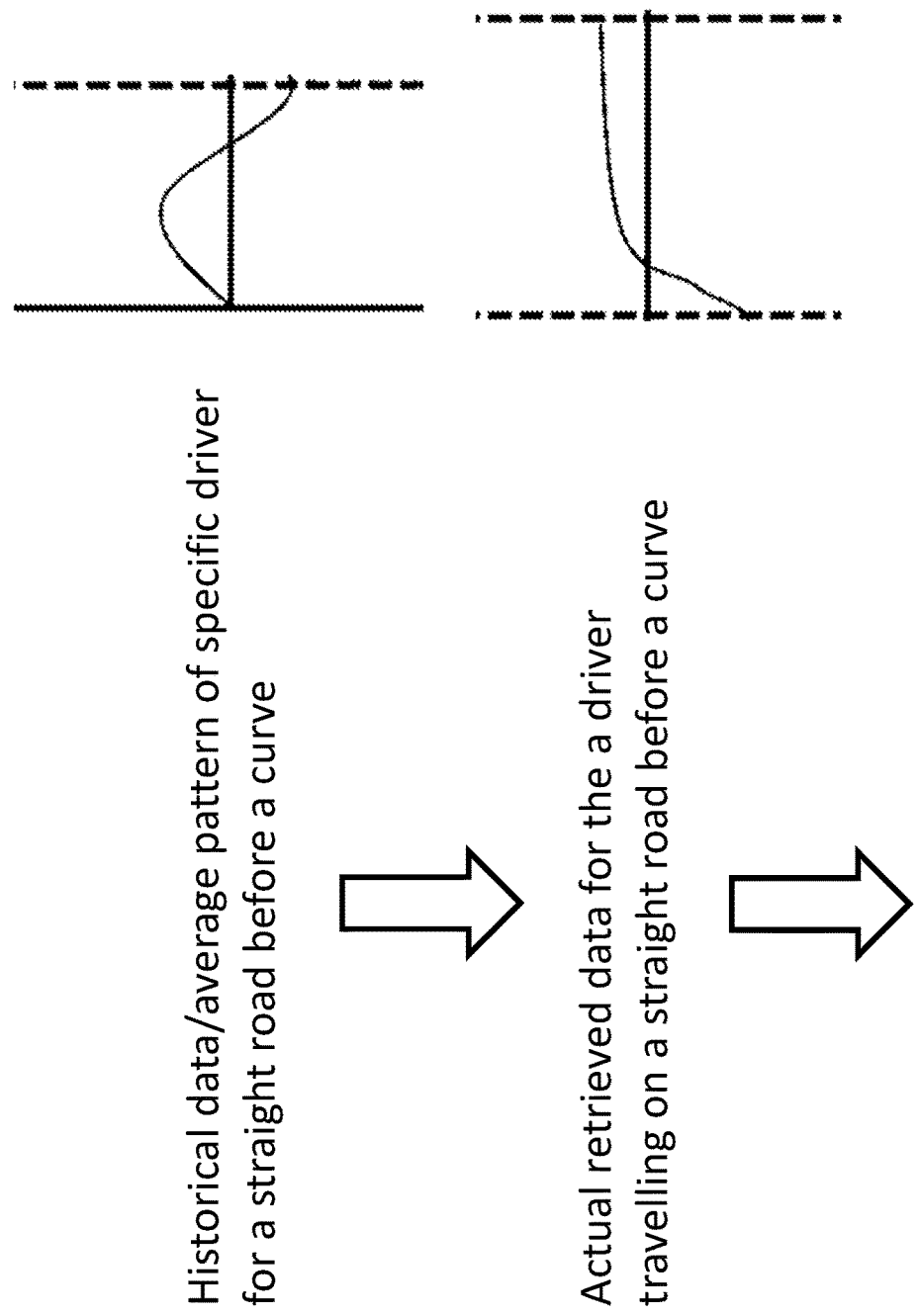
FIG. 7 shows a flow of steps for an automated authentication of a driver related to the claimed subject-matter.

The identification or automated authentication may be carried out after the manual authentication of steps A1 and A2 of FIG. 2. Preferably, the automated authentication is scheduled between one of the steps A3 to A5 after a predetermined time or amount of retrieved data has passed/was retrieved. The automatic authentication as for one example shown in FIG. 7 uses the actual retrieved data of the actual driving session and compares the data with the historical data including the patterns p and/or bands b described above. The comparison may include that the patterns p are mapped onto each other and then it is determined whether they are identical or whether some points deviate from each other. Depending on the allowed margin, deviation of single points can be tolerated, e.g. when the deviation is smaller than 5% or 10% or the like. Further, the patterns p may be compared by comparing the first or second derivatives with each other which may increase the accuracy of the comparison of the two patterns p. In regard of the bands b the comparison may preferably involve checking whether the actual band b calculated from the actually retrieved data is within a predefined margin of the historical band b of the driver. The predefined margin may again be in the range of some few percent. Further mathematical comparison operations may be performed in addition or alternatively for improving the accuracy of the comparison result.

In case that the comparison result is positive, i.e. the automatic authentication has identified that the driver is the same driver as the driver who has manually authenticated, the steps as described above are continued for the actual data retrieval session. However, in case that the comparison results should be negative, the automatic authentication may be repeated at a later time. In case that the authentication fails again, a final attempt may be carried out at the end of the data retrieval session. If the automated authentication repeatedly results in a "no match"-result (as shown for example in FIG. 7), the driver is informed accordingly and the data retrieval is stopped and the data retrieved so far during the actual data retrieval session is deleted. By the automated authentication a further measure of improving the data reliability can be provided. It may also be a preferred option to conduct the automatic authentication only at the end of a data retrieval session which reduces the computational burden.

Figure 8:
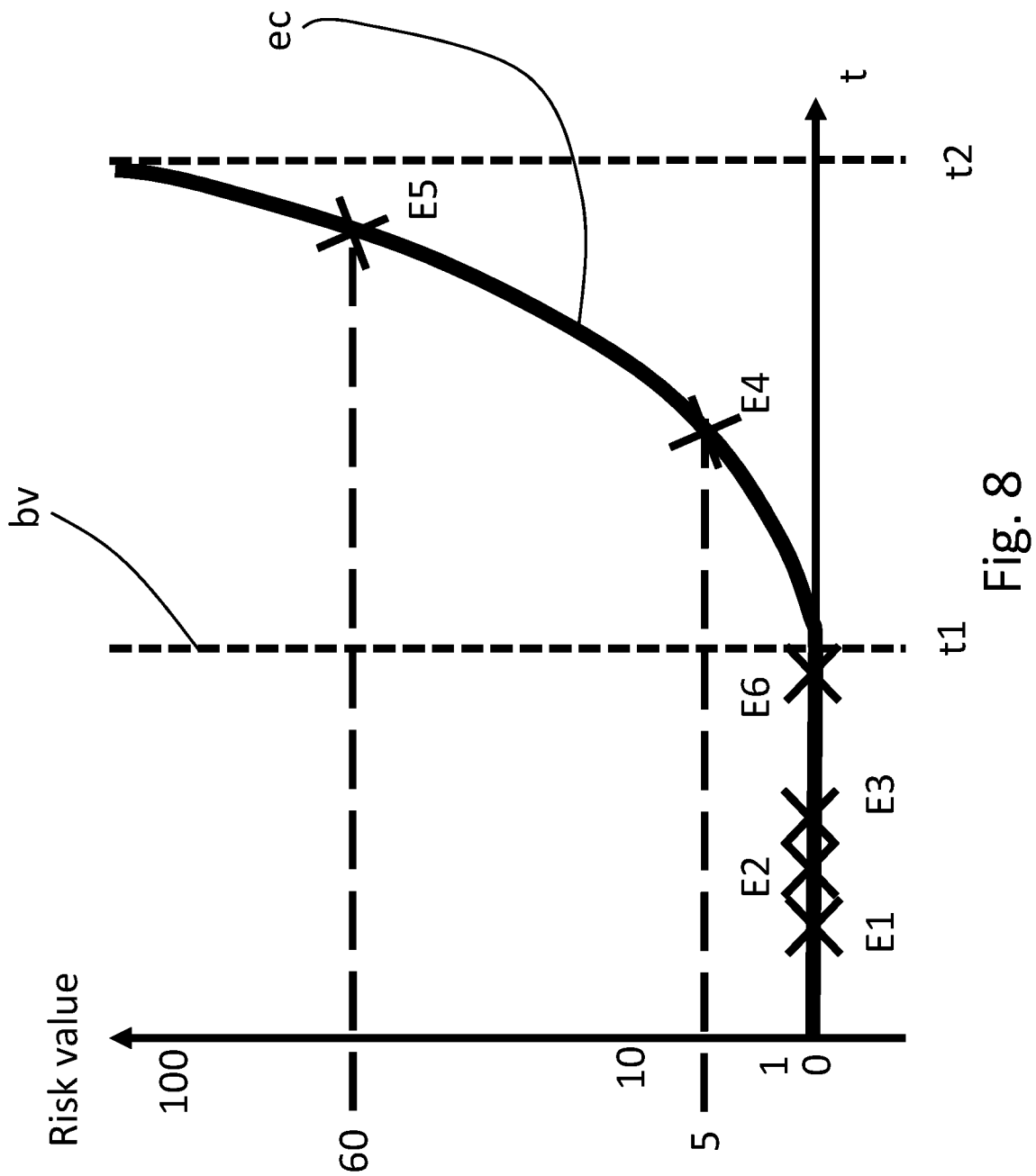
FIG. 8 shows an example for calculation driver-specific risk factor related to the claimed subject-matter.

FIG. 8 describes a further analysis according to the claimed method which allows to calculate/determine a safety/risk factor of the driver. The determination is based on the output of data providing units 5 of the mobile device 2 and those units 5 provided inside the vehicle 1 or external thereto. The determination proceeds in a way that evaluation curves ec are predefined and for example stored in a lookup table or the like for predefined driving situations. In the further description it is assumed, as one example, that one predefined driving situation is that the vehicle is approaching a curve ahead, for example the S curve as shown by FIG. 3. As it was described in connection with FIG. 4a, the driver will have to decelerate to a certain extend in order to be able to drive through the curve safely. However, the driver may perform the deceleration, i.e. the braking, in many different ways. For example, one driver may hit the brake pedal hard very shortly before the curve and another driver may start a smooth braking as soon as he/she sees the curve. Of course, many further possibilities for the braking action are possible and some are more critical when it comes to safety than other options. The evaluation curve ec enables to rate each braking event as will be described in the following. It is again noted that the description of a braking event is one example for many other possible predefined driving situations, like driving in a traffic jam during which, e.g., the distance to the other cars may be tracked, driving in a tunnel during which the travelling speed may be tracked, the driving during nighttime during which the acceleration behavior may be tracked, and so on.

The evaluation curve ec may include at least two sections which are divided by a boundary value by which is a predefined value on the x-axis. Preferably, the y values, which indicate a risk (value) are constant and more preferably they are 0 between x=0 and x=boundary value by. In the section of x>boundary value by, the y values increase or decrease, wherein an increase is a more preferred option. The boundary value by is set at a predefined distance or time ahead of the predefined driving situation. For example, in view of the example of the start of the curve, the boundary value by may be set at a distance from the start of the curve which is sufficient to bring the vehicle to a complete halt when driving at the allowed speed and braking normally, i.e. no emergency braking or the like. For example, normal braking may include that the braking pedal is pressed by not more than 25% or the like. The distance may also be set fixedly with a safety margin, such as 500 m before the start of the curve or the like. The boundary value by may also be defined by time, as shown in FIG. 8, so that e.g. a time t1 may be set as a boundary value by which is before the time t2 (estimated start of predefined driving situation), at which the vehicle will pass the start of the curve when constantly continue driving. The difference between t1 and t2 may be set in view of the allowed speed or fixedly set, e.g. 30 s or the like.

When a predefined driving situation occurs during the actual driving, e.g. the occurrence of a curve ahead, the corresponding evaluation curve ev is activated and the driving operation of the driver is monitored so that, e.g. in this example, the start of the braking action of the driver is recorded and mapped onto the evaluation curve ev. This is marked by event En (with n=1, 2, 3, . . . ) in FIG. 8 which shows that each driving situation results in another mark En and, in FIG. 8, an example is shown in which the driver has passed the respective driving situation 6-times, i.e. n=6. The FIG. 8 further shows that at E1 through E3 and E6 the driver did brake before the boundary value by of x. Two times however the driver braked later, wherein braking at E5 was much more risky than at E4 which is reflected by the higher risk value associated therewith. The risk factor of the driver for the example of FIG. 8 would then be calculated by adding up the y-values for each event E1 through E6. The risk factor may also be averaged by dividing the number of events/occurred predefined situations. The risk factor may be calculated for many different driving scenarios, such as driving on a narrow street, through a tunnel, heading into a traffic congestion and the like. An average of the different driving situations may then be calculated and output as the overall risk factor of the driver. The risk factor may be calculated for each driving session/data retrieval session so that an average over time and over many data retrieval sessions may be determined. The risk factor may be part of the information the driver may share with third persons as described above.

Further it should be noted that the example of FIG. 8 shows the use of a single evaluation curve ec. It is however possible that for the described example in which a driver approaches a curve more than one evaluation curve is used. It may be possible, for example, that, in addition to the evaluation curve ec for the output of G force sensor(s), an evaluation curve ec is used which maps the output of a distance sensor, too. The different output values of the different evaluation curves may be merged and, e.g., averaged to determine the risk factor for the specific driving situation. In other words, the accuracy of the determination of the risk factor for a specific predefined driving situation may be increased further when more than one sensor output is tracked and the corresponding evaluation curves ec are used.

Further, FIG. 9 shows a possible variant of a data format which includes post-processed data about a specific driver. For example, the data may include the driver's ID 4, the risk factors for different predefined driving situations as well as an overall risk factor, and driver-specific operation schemes saved separately for different driving conditions. Other formats are usable as well. The raw data may be saved as well together with the ID/identifier 4 of the driver.

Summarizing, the described and claimed subject-matter enables to track the behavior of a driver of a vehicle 2 even when the driver uses different vehicles 2 and it also ensures that risk factors of the driver, which may help to calculate insurance premiums and the like, are calculated in an uttermost precise and objective manner. Data fraud by letting other drivers drive or so is safely prevented by an automated authentication which makes use of the identified driver's "DNA or fingerprint". The combination of enabling a very accurate calculation of driver-specific risk factors and fraud-safe identification of this driver, has the technical advantage that the information about the driver is more reliable so that authorities, insurance companies and the like can rely on the information about the driver and the assessment of his driver skills with very high confidence.

What is claimed is:

1. A method for performing vehicle operation analysis of a driver, comprising:

disposing a mobile device in the vehicle;

authenticating the driver using a first authentication based on biometric data of the driver;
retrieving, by the mobile device, during a first data retrieval session, data of the vehicle, the data including data from a temperature sensor, a pressure sensor, a speed detection sensor, and data indicating steering angles, brake pedal pushing, gas pedal pushing, and engine revolutions over time;
adding a driver-specific identifier to the retrieved data which identifies the driver of the vehicle irrespective of the vehicle that is used;
sending the retrieved data to a remote computer;
performing analysis of said data in the remote computer, the analysis including generating a plot of one or more of the retrieved data, the plot having time as an axis and the plot corresponding with a section of a roadway on which the vehicle has traveled, the plot further being divided into sectors and each sector having a pattern based on the values of the retrieved data;
storing the generated plot;
storing a previously generated plot including one or more previously generated patterns of sectors based on historical data retrieved during a second data retrieval session that was before the first data retrieval session;
authenticating the driver using a second authentication by determining whether one or more of the sectors of the generated plot matches the previously generated corresponding one or more sectors;
upon determining the one or more of the sectors of the generated plot matches the previously generated corresponding one or more sectors, continue the retrieving of the data of the vehicle during the first retrieval session; and
upon determining the one or more of the sectors of the generated plot does not match the previously generated corresponding one or more sectors, discontinuing the retrieving of the data of the vehicle during the first data retrieval session and deleting the retrieved data during the first data retrieval session.

2. The method according to claim 1, the method further comprising:
automatically starting the first data retrieval session when a predetermined condition is fulfilled; and
performing the first authentication each time before a data retrieval session is started.

3. The method according to claim 1,
wherein the authenticating the driver using the second authentication is performed after a predetermined time of operating the vehicle by the driver.

4. The method according to claim 3,
wherein the historical data includes driver-specific vehicle operation schemes including clusters and/or bands which are specific for the driver, wherein the clusters and/or bands are updated by the retrieved data of the first data retrieval session.

5. The method according to claim 3,
wherein driver-specific clusters are generated by clustering the retrieved data; and
driver-specific bands are generated by plotting the retrieved data over time and by saving a minimum value and a maximum value of the output values for each driving sector,
wherein the dividing into one or more driving sectors is carried out based on predefined conditions.

6. The method according to claim 1, wherein
a risk analysis of the driver is performed during and/or after the first data retrieval session based on the retrieved data and historical data in order to calculate a driver-specific risk factor,
a result of the risk analysis including the driver-specific risk factor, is stored in the mobile device and/or the remote computer, and
wherein an existing result of the risk analysis is updated based on the actual risk analysis.

7. The method according to claim 6,
wherein the risk analysis includes using one or more predefined evaluation curves for the retrieved data,
wherein a y-axis of the evaluation curve indicates a risk value and a x-axis indicates time, and
wherein the evaluation curve has a section of constant y-values which extends to a predefined boundary value of x, and a section of rising y-values starting at x being equal or larger than the boundary value,
wherein each time a predefined driving situation occurs, the retrieved data are mapped onto the one or more evaluation curves and the actual y-axis value is retrieved, and
wherein the retrieved y-axis values are merged with previously retrieved values for computing the driver-specific risk factor for the driver which adapts over time.

8. The method according to claim 6, further comprising:
outputting, by the mobile device, information indicating feedback while driving including indicating the driver-specific risk factor and/or outputting a notification if predetermined boundary values are exceeded.

9. The method according to claim 6,
wherein the data of a driver including the driver-specific risk factor of the driver is stored on the remote computer.

10. A non-transitory computer readable medium storing a computer program executable by a processor, the processor being configured to carry out the method according to claim 1.

* * * * *